US006213218B1

(12) United States Patent
Miller

(10) Patent No.: US 6,213,218 B1
(45) Date of Patent: Apr. 10, 2001

(54) SOD LAYING APPARATUS

(76) Inventor: Donald R. Miller, 24645 W. 95th, Lenexa, KS (US) 66227

( * ) Notice: Subject to any disclaimer, the term of this patent is extended or adjusted under 35 U.S.C. 154(b) by 0 days.

(21) Appl. No.: 09/177,337

(22) Filed: Oct. 22, 1998

(51) Int. Cl.$^7$ .................................................. A01B 45/04
(52) U.S. Cl. ............................................. 172/19; 180/900
(58) Field of Search ........................ 47/1.01 R; 111/100; 180/209, 305, 308, 900; 280/42; 414/24.6; 172/19

(56) References Cited

U.S. PATENT DOCUMENTS

| 2,661,708 | * | 12/1953 | Pittman | 111/100 |
| 3,306,390 | * | 2/1967 | Jamme | 180/46 |
| 3,650,330 | | 3/1972 | Gieringer et al. . | |
| 3,698,730 | * | 10/1972 | Hansen | 280/5 E |
| 3,812,918 | * | 5/1974 | Beck | 172/19 |
| 3,982,711 | | 9/1976 | Bradley et al. . | |
| 4,067,393 | * | 1/1978 | Szarkowski | 172/19 |
| 4,354,556 | | 10/1982 | Evans . | |
| 4,363,374 | * | 12/1982 | Richter et al. | 180/209 |
| 4,599,030 | * | 7/1986 | Skaalen et al. | 414/460 |
| 4,754,815 | * | 7/1988 | Brouwer et al. | 172/19 |
| 4,777,890 | * | 10/1988 | Raymond | 172/19 |
| 4,878,542 | | 11/1989 | Brouwer et al. . | |
| 5,083,517 | * | 1/1992 | Stevens et al. | 111/100 |
| 5,129,462 | | 7/1992 | Mail . | |
| 5,215,278 | | 6/1993 | Hess . | |
| 5,307,880 | | 5/1994 | Woerner . | |
| 5,437,528 | | 8/1995 | Decker . | |
| 5,464,243 | * | 11/1995 | Maiwald et al. | 180/906 |
| 5,697,452 | | 12/1997 | Link . | |
| 5,938,392 | * | 8/1999 | Duck | 414/24.6 |

FOREIGN PATENT DOCUMENTS

094006270 * 3/1994 (WO) .................................... 172/19

* cited by examiner

Primary Examiner—Thomas B. Will
Assistant Examiner—Nathan Mammen
(74) Attorney, Agent, or Firm—John C. McMahon

(57) ABSTRACT

A sod laying self propelled apparatus having a mobile frame mounted on front and rear wheels. The frame has front and rear sections that are articulated to allow the wheels to follow rough terrain. The frame front section has a U-shaped opening to allow receipt of a roll of sod therein without lifting the roll. The frame includes sod lifting arms with a two way hydraulic cylinder to raise the roll once in the roll is in the opening and in such a manner as to generally evenly distribute weight of the roll to each of the wheels. The front wheels are swingable between outside and inside positions relative to front frame arms to change the configuration thereof and include a locking mechanism to lock the configuration. The sod lifting arms are also engageable with a cross bar on a transport truck to allow the apparatus to be rotated relative to the sod raising arms and lifted from the ground for transport. A removable forklift is mountable on the frame for removing sod from a transport truck. Each of the wheels includes a hydraulic motor and the front wheel motors may be reversed depending on their configuration to allow all the wheels to drive in the same rotational direction.

14 Claims, 5 Drawing Sheets

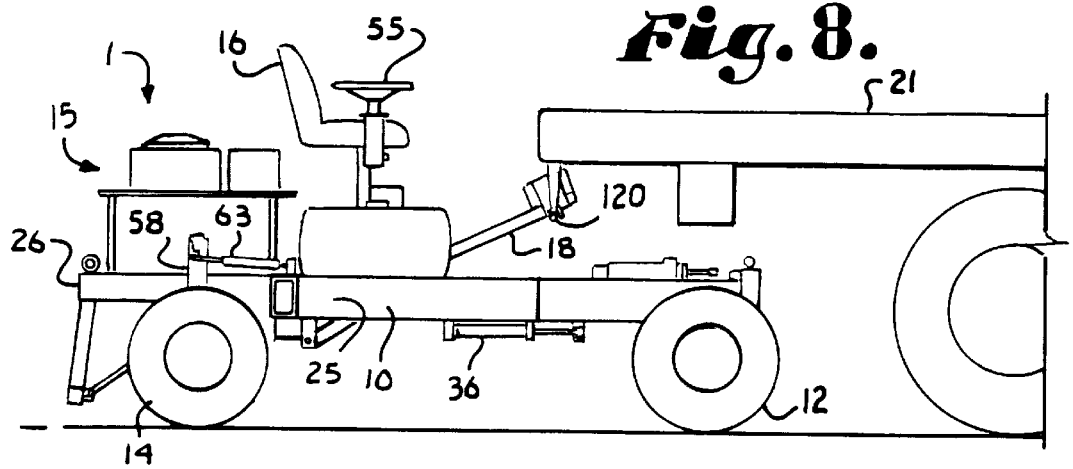
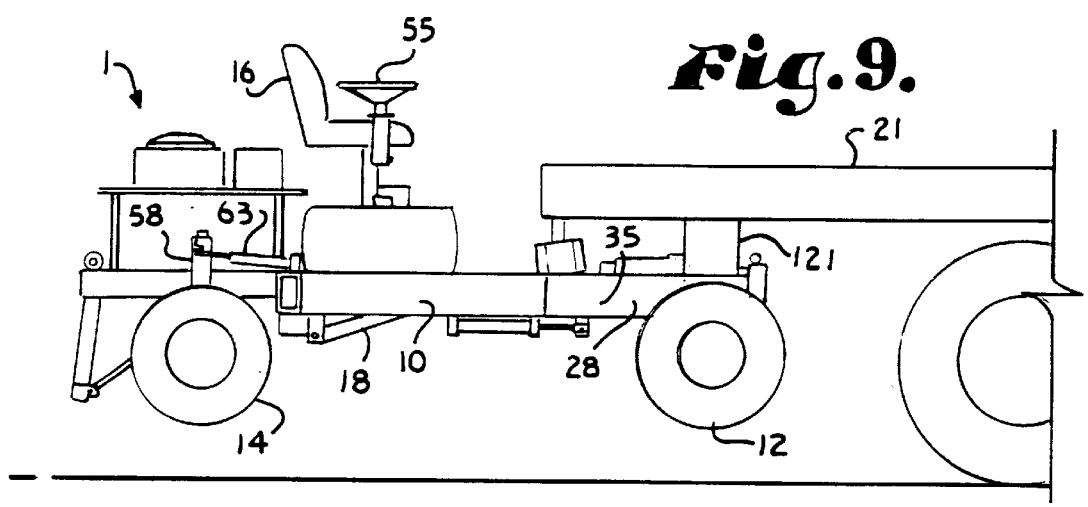
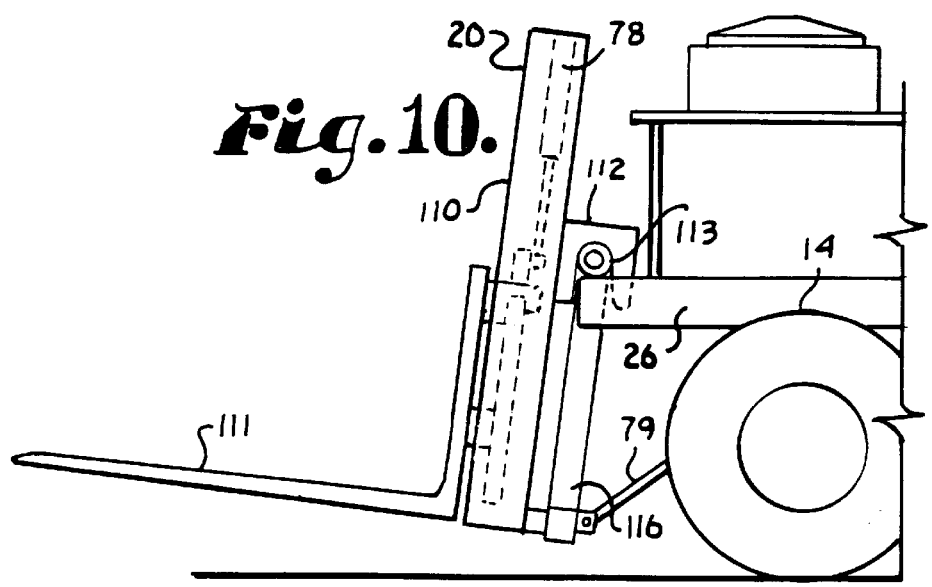

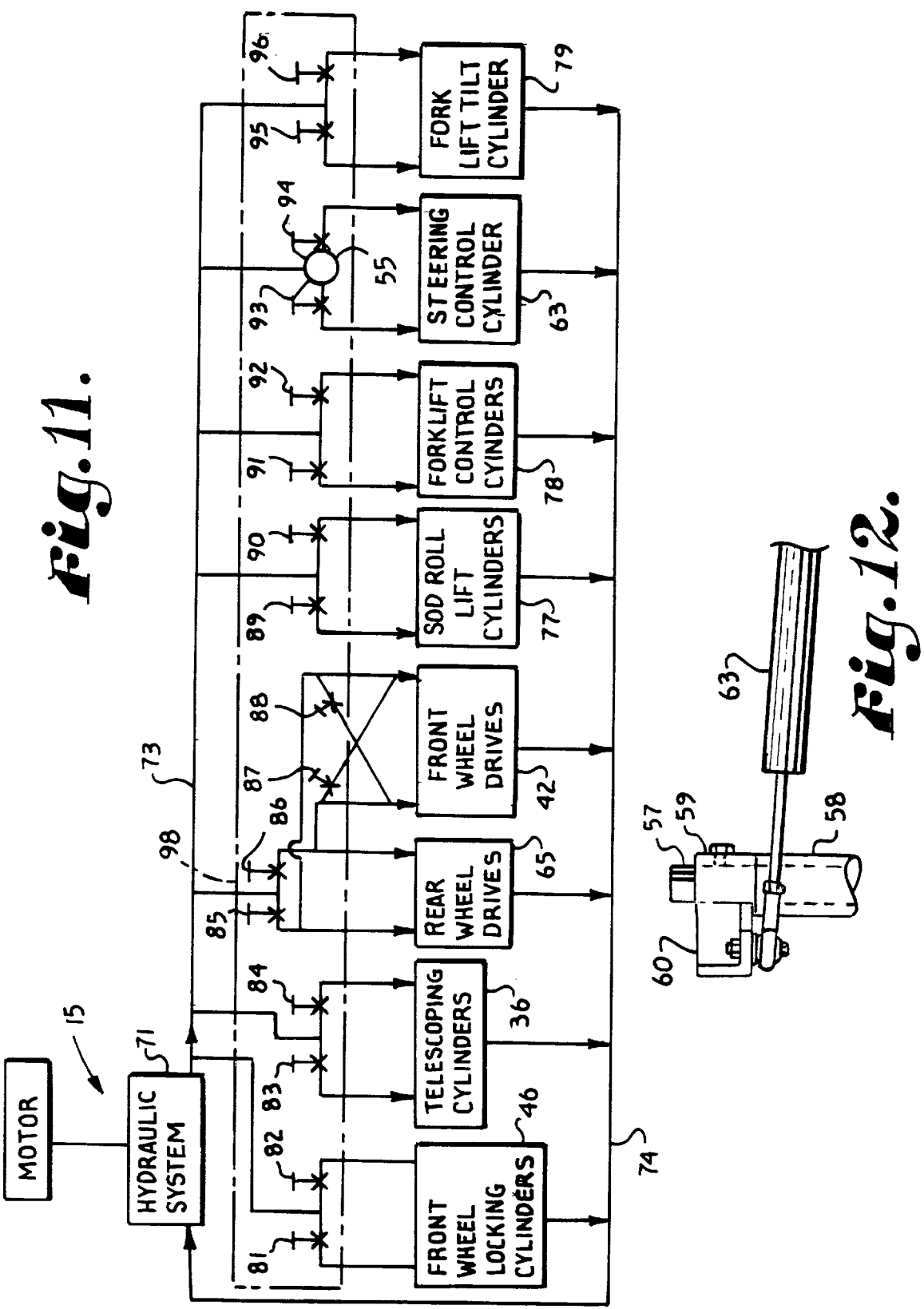

SOD LAYING APPARATUS

BACKGROUND OF THE INVENTION

The present invention is directed to a mechanized apparatus to assist a crew in laying cut sod in residential yards, commercial establishments, athletic fields and the like.

In new construction, grass surrounding the construction is normally destroyed by the construction or ground shaping associated with the construction. Even without construction, grass sometimes dies or is absent from an area for some reason. Because grass often takes a long time and a great amount of work to grow from seed and, further, because the area where seed is growing is often muddy and is subject to severe washing, it is often desirable to place sod grown elsewhere on such areas to provide immediate grass coverage, erosion and mud control and to substantially improve the appearance of the area.

Consequently, transfer of sod from a growing site or sod farm to a region needing sod, especially residential housing, has become commonplace. With ever increasing demand for such sod, it has become practical for sodding crews to try to improve the efficiency of sod laying. This is accomplished by mechanizing the procedure and by substantially increasing the size of the rolls of sod to reduce the number of individual rolls that must be handled. Therefore, the present invention is designed to assist in the laying of rolls of sod, especially large, heavy rolls that weigh 2000 pounds or more.

Sod is often laid on uncovered dirt, which easily turns to mud when it has rained recently. Such mud makes sod laying difficult or halts it completely because the laying apparatus sinks into the mud. Also in the past, such sod laying has often been accomplished by a forklift or tractor which lifts the roll either to the front or rear of the device. This produces a very uneven distributing of the weight such that the wheels of the associated end tend to be driven deeply into mud or soft dirt. Therefore, a mechanized apparatus is desirable that is mechanically driven, unrolls the sod at the location where the sod is needed and spreads the weight of the sod and apparatus somewhat evenly over the apparatus and over a large area to prevent miring in mud.

Furthermore, sod laying machines must be able to traverse uneven ground and yet maintain ground contact with the wheels to provide traction and reduce the likelihood of miring or producing deep tracks. The present invention provides for articulation of the frame to help insure that all of the wheels remain in contact with uneven ground.

It is also desirable that the sod laying apparatus be able to be driven to the sod and that the sod be quickly loaded and easily raised by the apparatus. In order to accomplish this, the front wheels must be spaceable at least enough for sod rolls to pass through, since the rolls are too heavy to easily lift to the center of the apparatus. Unfortunately, when the wheels are so spaced, the apparatus will not pass through many gates and certain other obstructions. Consequently, it is desirable that the wheels be swingable between loading and gate traversing positions. Further, it is desirable that a driver be able to control such swinging from the driver's seat.

Another problem associated with a sod laying apparatus of this type is getting the apparatus to the worksite. The present invention is designed to provide for simple and quick securement of the apparatus to the rear of a transport truck using hydraulic sod roll lift arms without need for additional equipment or parts. Further, it is desirable that the sod layer have the ability to also unload sod from the truck to reduce the need for a separate forklift. The ability to unload is provided by a forklift attachment for the apparatus that can be easily attached and disconnected and which can be operated by a driver by simple swinging of the driver's chair. To reduce the weight of the apparatus during sod laying, it is desirable for the forklift attachment to be easily detached.

SUMMARY OF THE INVENTION

A sod laying apparatus is provided for raising, transporting and laying sod rolls of different sizes, especially large rolls weighing a ton or more. The sod laying apparatus includes an open ended frame that allows the apparatus to drive to and surround a roll of sod, such that the roll is generally between the wheels of the apparatus.

The apparatus includes a frame that has front and rear sections which pivot relative to each other. In particular, the front section includes front wheels and the rear section includes rear wheels with the two sections being pivotal about a front to rear axis to allow all four of the wheels to remain in engagement with the ground when traversing rough terrain.

The frame front section includes a pair of elongate arms which are positioned on opposite sides, and each of the arms has one of the front wheels near a distal end thereof. The front wheels are mounted on a vertical pivot that allows them to pivot relative to arms from a sod loading position wherein the wheels are outside the arms to a gate clearing position wherein the wheels are located between the arms. A hydraulic locking system allows an operator to secure the wheels in either configuration from a drivers seat.

The apparatus also includes sod lifting arms pivotally mounted at one end to the frame and being controlled by a hydraulic cylinder. The sod lifting arms raise and elevate the rolls of sod during laying and also are sized and shaped to join with a bar on a transport truck to raise the apparatus off the ground during transport.

An easily attached and detached forklift is selectively used to remove sod rolls from a transport truck.

The apparatus includes a gasoline motor that operates a hydraulic system. The hydraulic system includes units to drive the front and rear wheels, and cylinder to operate the front wheel locks, the position of the forklift, steering, the tilt of the forklift, and telescoping of the frame arms which can all be controlled from the drivers seat. The hydraulic system also allows for reverse rotation of the front wheels when moving between the two configurations thereof.

OBJECTS AND ADVANTAGES OF THE INVENTION

Therefore, the objects of the present invention are to provide a sod laying apparatus that easily loads sod into the apparatus and traverse ground while laying such sod; to provide such an apparatus that allows an operator to control most of the operation of the apparatus from a driver's seat; to provide such an apparatus having an articulated frame that allows the apparatus to effectively traverse uneven ground; to provide such an apparatus wherein weight of both sod and apparatus are distributed over a large area and that has wide tires to improve traction in mud and reduces rutting; to provide such an apparatus having front wheels that can be manipulated between a wide body configuration to load sod and a comparatively narrow gate traversing configuration to allow the apparatus to pass through narrow gates and the like; to provide such an apparatus that is adapted to be mounted on a transport truck by operation of sod lifting arms; to provide such an apparatus that may be cooperatively joined to a forklift mechanism to allow offloading of sod from a transport truck; to provide such an apparatus including a telescoping frame to operably allow the frame to be shortened for transport; and to provide such an apparatus that is comparatively easy to operate and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 8 is a side elevational view of the sod laying apparatus in conjunction with a transport truck with the apparatus in an unloaded configuration.

FIG. 9 is a side elevational view of the sod laying apparatus and truck with the apparatus in a transport configuration.

FIG. 10 is a side elevational view of the sod laying apparatus showing a forklift attachment mounted on the apparatus.

FIG. 11 is a simplified schematic view of a motor and hydraulic system of the sod laying apparatus.

FIG. 12 is a fragmentary side elevational view of a rear wheel control for the sod laying apparatus, taken from the circle 12 of FIG. 2.

DETAILED DESCRIPTION OF THE INVENTION

Figure 1:
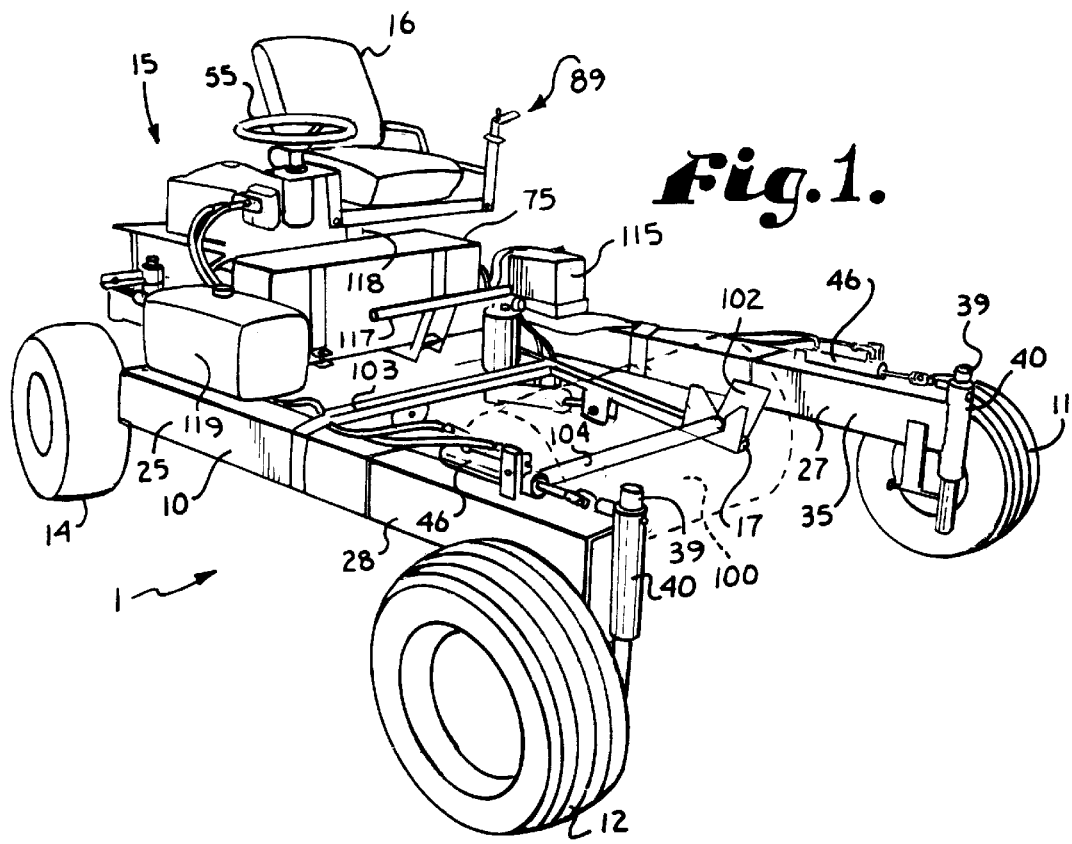
FIG. 1 is a perspective view of a sod laying apparatus in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a sod laying apparatus in accordance with the present invention.

The apparatus 1 includes a frame 10, front wheels 11 and 12, rear wheels 13 (FIG. 3) and 14, a motor and hydraulic system 15, a driver's seat 16 and a pair of hydraulic operated sod lifting arms 17 and 18. A forklift apparatus 20 (FIG. 10) is removably securable to the rear of the apparatus 1. The apparatus 1 is conveyed by a truck 21 (FIGS. 8 and 9) to a site of operation.

The frame 10 is articulated and includes a rectangular rear portion 25 pivotally joined to a rectangular front portion 26. A pair of left and right (as seen from the drivers seat position in FIG. 1) elongate arms 27 and 28 are attached to and extend forward from front portion 26 to form a generally forwardly open U-shaped structure in a generally horizontal frame.

Figure 3:
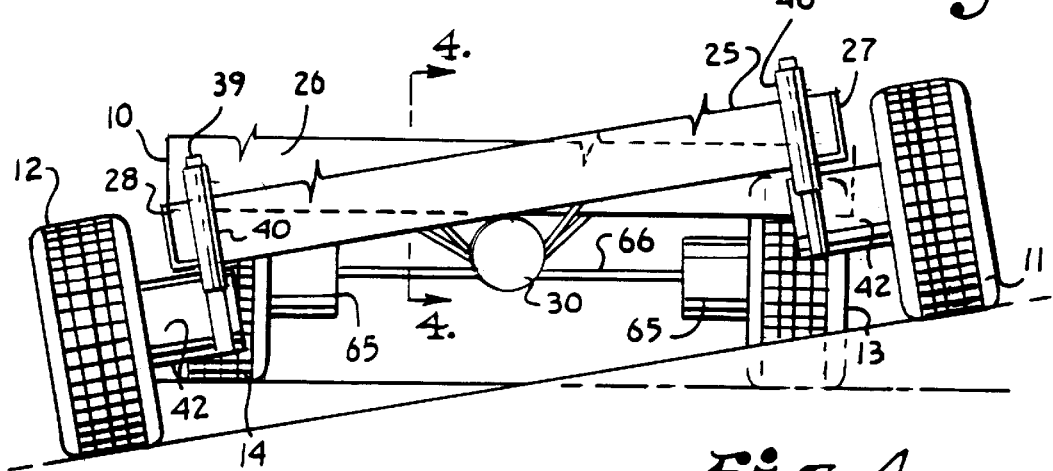
FIG. 3 is a fragmentary front elevational view of the sod laying apparatus, showing articulation of a frame of the apparatus on uneven ground.
Figure 4:
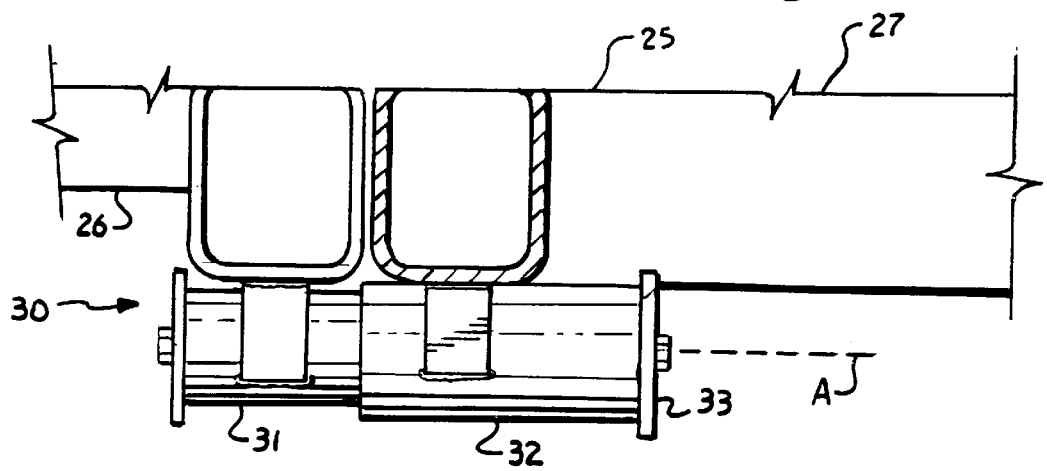
FIG. 4 is an enlarged and fragmentary cross-sectional view of the sod laying apparatus, taken along line 4—4 of FIG. 3.

The frame rear portion 25 and front portion 26 are abutting and joined by a pivot 30 (as seen in FIG. 4). The pivot 30 includes an inner pivot shaft 31 slideably mounted in a sleeve 32. The shaft 31 is held in the sleeve 32 by an end cap 33. The shaft 31 is welded to the frame rear portion 25, and the sleeve 32 is welded to the frame front portion 26. The pivot 30 allows the frame portions 25 and 26 to articulate about a roll axis A that extends from front to rear of the apparatus 1 along the center thereof, such that the frame portion 25 and 26 can pivot relative to each other, as seen in FIG. 3, to allow all four wheels 11, 12, 13 and 14 to remain in engagement with the ground when on uneven terrain.

Each front wheel 11 and 12 is mounted on a vertically aligned spindle 39 pivotally received in a respective sleeve 40. Each of the sleeves 40 are welded to a front end of respective frame arms 27 and 28.

Figure 5:
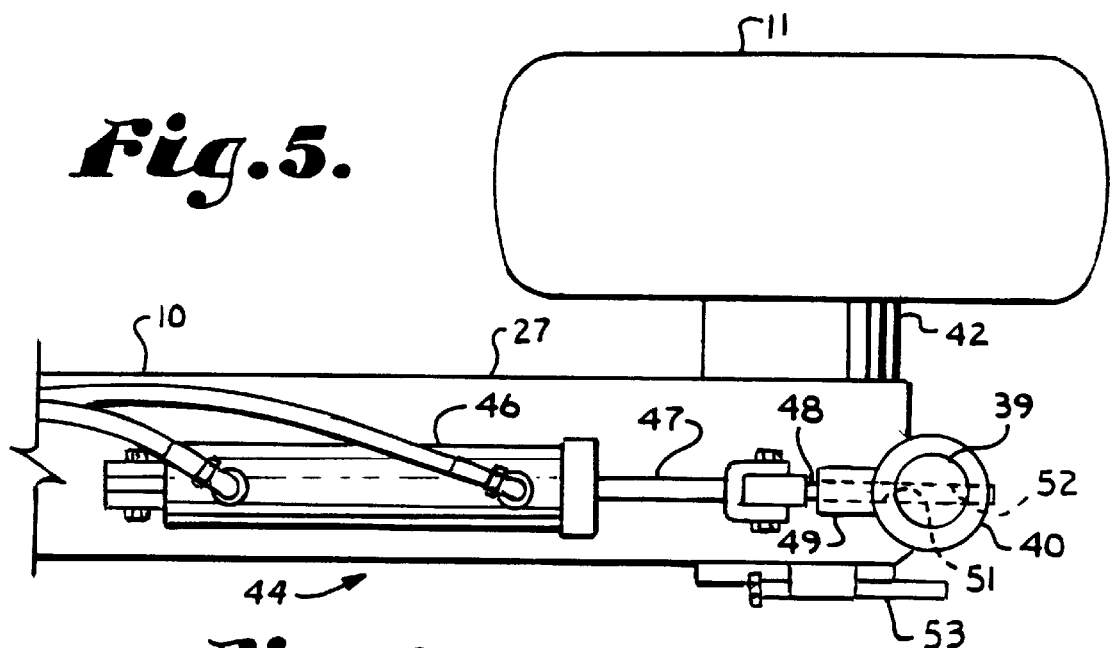
FIG. 5 is an enlarged and fragmentary top plan view of the frame and a front wheel assembly of the sod laying apparatus showing a front wheel in a sod loading configuration and a locking mechanism in a locked position.
Figure 6:
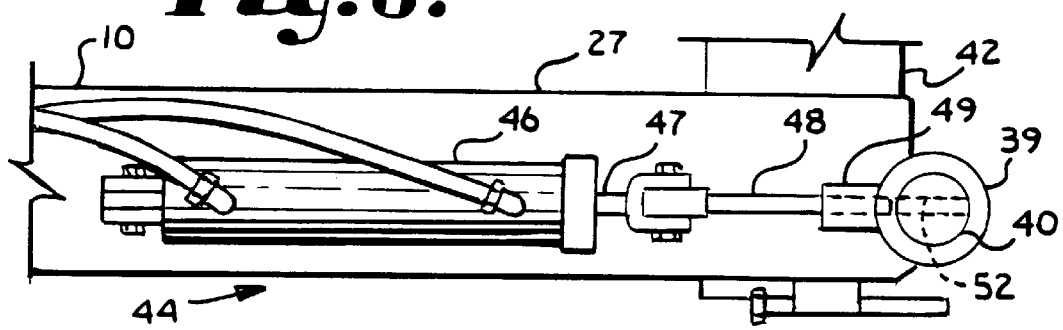
FIG. 6 is a view similar to FIG. 5 except with the locking mechanism in an unlocked position.

Each front wheel 11 and 12 also includes a locking assembly 44 (FIGS. 5–7) to secure the wheels 11 and 12 in a selected configuration. Each locking assembly 44 includes a bidirectional acting hydraulic cylinder 46 secured to a respective arm 27 or 28 and having a shaft 47, and a pin 48 pivotally connected to the shaft 47 and a guide 49 secured to a respective arm 27 or 28. The pins 48 are aligned with bores 51 in the sleeves 40 and are selectively alignable from opposite sides with bores 52 in the spindles 39. In particular, each pin 48 is positioned in respective bores 51 and 52 to lock the wheels 11 and 12 in either of the configurations thereof, as seen in solid lines in FIGS. 5 and 7. FIG. 5 shows the pin 48 in the bores 51 and 52. FIG. 6 shows the pin 48 withdrawn from the bores 51 and 52, so as to allow the wheel 11 to rotate. The locked and unlocked configurations of each pin 48 are positioned by the cylinder 46. A stop 53 limits and positions the wheels 11 and 12 as the wheels 11 and 12 swing inwardly, such as is shown in FIG. 7.

The left and right elongate arms 27 and 28 telescope in order to decrease length for transport, as described below, or to increase length for sod laying. The arms 27 and 28 each include a forward section 35 (FIG. 2) that is slideably received in the remainder of each arm 27 and 28. The relative position of the sections 35 and, consequently, the length of the arms 27 and 28 is controlled by hydraulic cylinders 36.

Figure 7:
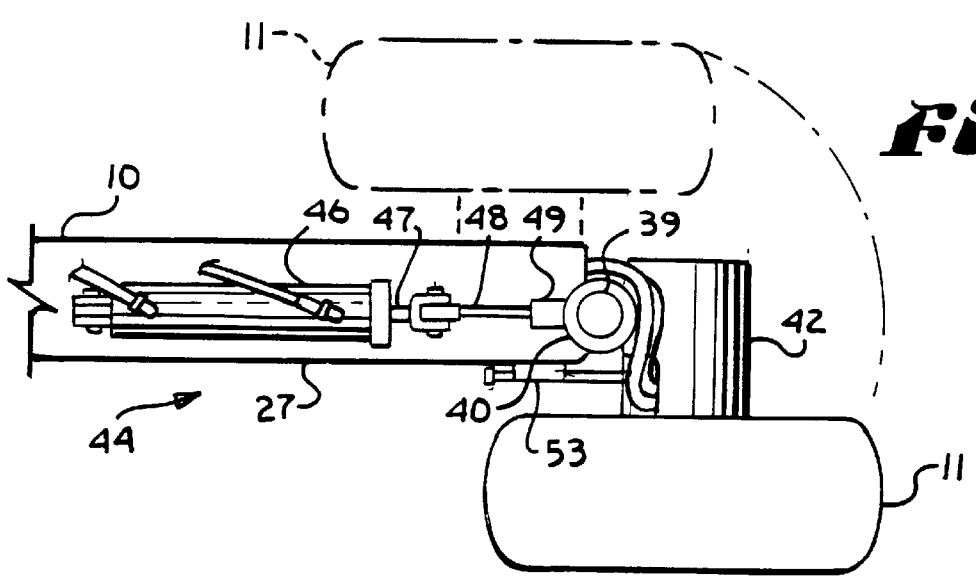
FIG. 7 is a view similar to FIG. 6 except with the wheel shown in a gate traversing configuration.

The front wheels 11 and 12 are position adjustable, see FIG. 5, 6 and 7 relative to the arms 27 and 28. In particular, each of the front wheels 11 and 12 is pivotal between a narrowed or gate traversing configuration (solid lines in FIG. 7) and a widened or sod roll engaging configuration (FIGS. 1 and 6) that allows for the distribution of weight of the apparatus 1 over the greatest ground area. In the narrowed configuration the wheels 11 and 12 are located between the arms 27 and 28, whereas in the sod roll engaging position, the wheels 11 and 12 are laterally positioned outside the arms 27 and 28.

Each of the wheels 11 and 12 is attached to a respective arm 27 and 28 by the vertically aligned pivot shaft or spindle 39 received in a respective sleeve 40 welded to a respective arm 27 and 28. Associated with each wheel 11 and 12 is a hydraulic drive motor 42 that pivots with a respective wheel 11 or 12 and operably rotates or drives the wheels 11 and 12 under control of an operator. Such hydraulic drives are commonly used on zero turning radius mowers and similar devices familiar to those who have skill in the art.

The rear wheels 13 and 14 are pivotally mounted on the frame rear portion 26 for steering purposes, whereas the front wheels 11 and 12 are normally locked in position except when the changing configuration. The rear wheels 13 and 14 are pivotal under control of a steering wheel 55. In particular, each of the rear wheels 13 and 14 has a vertical axle, shaft or spindle 57 received in a bearing sleeve 58 with the sleeve 58 being welded to the frame rear portion 26 (see FIG. 12). The position and controllability of the rear wheels 13 and 14 allow the apparatus 1 to turn upon a relatively small radius to allow good overall control of direction of movement of the apparatus 1 by an operator.

A cuff 59 is fixed to and rotates with the spindle 57 associated with wheel 14. The cuff 59 is attached to a perpendicularly extending crank arm 60. The crank 60 is in turn attached to a hydraulic cylinder 63, that is secured at one end to the frame rear portion 26. The cylinder 63 is hydraulically connected to and operated by the steering wheel 55 to allow an operator to turn and control the direction of the rear wheels 13 and 14. A tie rod 66 (FIG. 3) joins the rear wheels 13 and 14 and assures that both are aligned. Each of the rear wheels 13 and 14 also include a hydraulic drive motor 65.

The motor and hydraulic system 15 is shown schematically in FIG. 11. The system includes a fuel powered internal combustion motor 70 mounted on the frame 10. The motor 70 drives a hydraulic system 71 that discharges hydraulic fuel under pressure into a supply conduit 73 and hydraulic fluid is returned to the system 15 by return conduit 74. The hydraulic system 15 is of a conventional type including a hydraulic fluid pump and a reservoir 75 (FIG. 1).

The hydraulic system 71 supplies hydraulic fluid to a number of different systems within the apparatus 1, including the front wheel locking cylinders 46, the arm telescoping cylinders 36, the rear wheel drives 65, the front wheel drives 42, sod roll arm cylinders 77 (FIG. 2), a fork lift control cylinder 78 (FIG. 10), the steering control cylinder 63 and a fork lift tilt cylinder 79.

Forward and reverse acting valves 81 and 82 control flow to and rotational direction of the front wheel locking cylinder 46, and a similar set of valves 83 and 84 control flow to and direction of the telescoping cylinders 36. Valves 85 and 86 control rotational direction and speed of the rear wheel drives 65 and front wheel drives 42, while cross over valves 87 and 88 allow reversing control and speed of the front wheel drives 42. The valves 85 and 86 are part of a hand controller associated with the hydraulic pump and allow an operator to simultaneously and directly control direction and speed of all four wheels 11, 12, 13 and 14. Up and down valves 89 and 90 raise and lower the position of the distal ends of sod roll arms 17 and 18 through operation of the sod roll arm cylinder 77.

Valves 91 and 92 raise and lower the position of the fork lift fork 111 (FIG. 10) through the forklift control cylinder 78. Valves 93 and 94 control the operation of the steering control cylinder which are in turn controlled by position of the steering wheel 55. And valves 95 and 96 control the position of the fork lift tilt cylinder 79 which controls the tilt of the fork 111. All of the valves 81 through 96 are within the operator control and steering system 98 generally identified by the dashed box in FIG. 11 and generally positioned in and around the driver's seat 16 to allow easy access thereto by an operator during operation of the apparatus 1.

Figure 2:
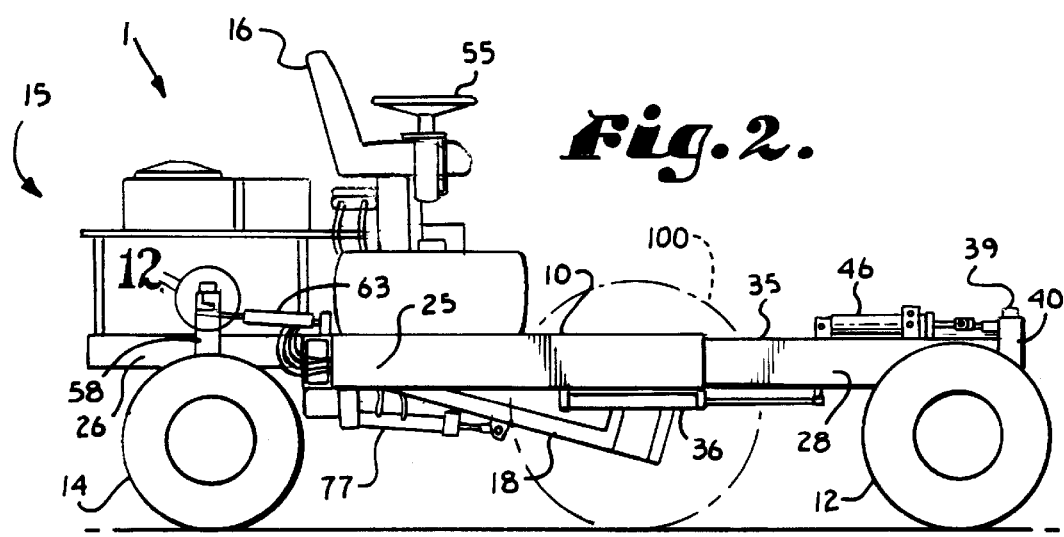
FIG. 2 is a side elevational view of the sod laying apparatus.

The sod roll lifting arms 17 and 18 are best seen in FIGS. 1 and 2 and have two major functions. The first function of the arms 17 and 18 is to raise a roll of sod 100 for transport to the site of laying and then support the roll 100 as the roll 100 is unrolled and spread on the ground. The second function of the arms 17 and 18 is to lift the apparatus 1 off the ground so as to be supported by a transport truck 21, as seen in FIG. 9.

The arms 17 and 18 are elongate and each is pivotally joined at one end to the frame 10. An opposite end of each arm supports a sod bar attachment 102 with a shield. The arms 17 and 18 are joined near the frame 10 by a cross bar 103. The sod roll control cylinders 77 are secured at one end to the frame 10 and at an opposite end to the arms 17 and 18. The sod roll control cylinder 77 pivots the arms 17 and 18 through an arc and about the connection thereof to the frame 10 so as to selectively raise or lower the distal ends of the arms 17 and 18.

Positioned in and extending between the bar attachment 102 is a sod roll support bar 104. The bar 104 is received through a larger tube (not shown) upon which the roll 100 is rolled.

The fork lift apparatus 20 is shown in FIG. 10 and is easily removable. The purpose of the fork lift apparatus 20 is to remove sod rolls from the transport truck 21, and the forklift apparatus is removed thereafter to reduce the overall weight of the apparatus 1 during sod laying. The fork lift apparatus 20 is of conventional type having a generally vertically aligned frame 110 upon which is supported a fork 111 that is tracked to move up and down the frame 110. The vertical position of the fork 111 is controlled by the fork lift control cylinder 78. The fork lift frame 110 includes an open channel rear mount 112 that is pivotally received over a rear bar 113 secured to the rear of the frame 10 to hold the forklift apparatus 20 and allow same to rotate relative to the frame 10. Also pivotally attached to the rear of the frame 10 is a fork lift brace 116. The brace 116 extends downwardly from the frame 10 and is connected to the fork lift tilt cylinder 79 that in turn controls the amount of tilt of the brace 116 which then controls the tilt of the fork lift apparatus 20 as the apparatus 20 pivots relative to the frame 10 about the rear bar 113.

The frame 10 also includes a footrest 117 secured to the frame front portion 25 behind where a sod roll 100 is received. The driver seat 16 is mounted on a pivot 118 that allows the seat 16 and part of the associated control system 98 to swing 180° so the operator can visually watch operation of the forklift apparatus 20. Also mounted on the frame 10 is a gas tank 119 and battery 115 to support the motor 70.

In use, the apparatus 1 is normally operated by an operator from the seat 16. The apparatus 1 is driven with the front wheels 11 and 12 in the sod roll engaging position up to a roll of sod 100 such that the roll 100 passes between the frame arms 27 and 28. The sod bar 104 is placed through the roll 100 and the sod roll arms 17 and 18 are positioned to receive the bar 104 in the distally positioned bar attachments 102. The cylinder 77 is then activated to swing the arms 17 and 18 to raise the roll 100.

The roll 100 is transported to the location where sod is to be laid and the operator leans forward to remove pins (not shown) from the sod roll 100 to allow it to unroll and to initially place the end of the roll 100. Therefore, the operator normally moves forward although sod can be laid in either direction until the sod roll 100 is completely unrolled. Thereafter, the process is repeated.

If during use the apparatus 1 must traverse a tight passage, such as a gate, the front wheels 11 and 12 are swung inwardly, as seen in FIG. 7, by unlocking the locking assemblies 44, swinging the wheels 11 by simply moving forward and then relocking the locking assemblies 44. The procedure is reversed to swing the wheels 11 and 12 outwardly.

To use the forklift apparatus 20, the operator places the forklift rear mount 112 over the bar 113 and connects the cylinder 78 to the hydraulic system 15. The fork raises and lowers under control of the cylinder 78 and tilts under control of the cylinder 79.

To transport the apparatus 1, the arms 27 and 28 are normally shortened by operation of the cylinders 36, and the apparatus is positioned under the rear of the bed of the transport truck 21. The truck 21 includes a rear engagement bar 120 and a stop 121. The bar 120 depends from and extends across the rear of the truck 21. The bar 120 is sized, shaped and positioned to receive distal ends of the sod lifting arms 17 and 18 when in a raised position thereof. The distal ends of the arms 17 and 18 are then lowered by operation of the cylinder 77 to raise the apparatus 1 from the ground (see FIG. 9). The stop 121 engages the front of the apparatus arms 27 and 28 to position the apparatus 1 in a transport position thereof. To use the apparatus 1, this procedure is reversed.

It is noted that the various hydraulic cylinders used in operation of the described apparatus are dual acting motors, that is the cylinders are drivable in both directions and could be equivalently replaced by other devices providing an equivalent function such as an electric motor.

It is to be understood that while certain forms of the present invention have been illustrated and described herein, it is not to be limited to the specific forms or arrangement of parts described and shown.

What is claimed and desired to be secured by Letters Patent is as follows:

1. A sod lay apparatus comprising:
   a) a structural frame having a pair of spaced apart frame arms; said frame arms being fixed in generally parallel relation with respect to each other;
   b) a first pair of ground engaging wheels with each of said first pair of wheels mounted on a respective frame arm; each of said first pair of wheels being rotatable relative to a respective frame arm so as to be selectively positionable on opposite sides of a respective frame arm such that said first pair of wheels has a widened configuration wherein each wheel is positioned on an outer side of a respective frame arm and a narrowed configuration wherein each wheel is positioned on an inner side of a respective frame arm such that the apparatus is configured to pass through comparatively narrow obstacles;
   c) a third ground engaging wheel supporting said frame opposite said arms;
   d) a pair of spaced sod lifting arms; said sod lifting arms being located between said frame arms and being pivotally mounted at one end to said frame and being adapted to engage a roll of sod at an opposite end; and
   e) a hydraulically operated cylinder operably connected to said sod lifting arms and said frame, such that said sod lifting arms are adapted to selectively raise, support and unroll a sod roll.

2. The apparatus according to claim 1 wherein:
   a) each of said first pair of wheels includes a wheel mounting structure to allow each of said first pair of wheels to rotate about a front end of a respective frame arm about a vertical axis.

3. The apparatus according to claim 1 including:
   a) a pair of dual acting fluid operated cylinders joined respectively to each of said first pair of wheels and operably allowing a user of said apparatus to lock said first pair of wheels in a selected one of said widened and said narrowed configurations.

4. The apparatus according to claim 1 including:
   a) a locking mechanism to selectively lock or unlock the configuration of each wheel; and
   b) each of said wheels being swingable between widened and narrowed configurations by reversing movement of the apparatus between front and rear directions when said locking mechanism is in the unlocked configuration thereof.

5. The apparatus according to claim 1 wherein:
   a) said apparatus is self propelled.

6. The apparatus according to claim 1 wherein:
   a) each of said first pair of wheels is driven by a hydraulical motor; and
   b) including operator controls that control rotation of said first pair of wheels; said first pair of wheels reversing direction of rotation when said first pair of wheels swings between said widened configuration and said narrowed configuration; said operator controls automatically compensating for said wheel configurations to allow an operator to coordinate rotation of all said wheels, as driven by said hydraulic motors, so as to allow the operator to drive said apparatus in either configuration.

7. The apparatus according to claim 1 including:
   a) a fourth wheel; said first pair of wheels being on opposite sides of a front of said apparatus and said third and fourth wheels being on opposite sides of a rear of said apparatus.

8. The apparatus according to claim 1 wherein:
   a) said sod lifting arms cylinder is dual acting; said sod lifting arms also being sized and shaped to be adapted to engage a bar on a truck and by reverse operation of said sod lifting arm cylinder raise said apparatus off the ground so as to be supported by the truck.

9. The apparatus according to claim 8 wherein:
   a) said frame arms selectively telescope.

10. The apparatus according to claim 1 wherein:
    a) each of said wheels is driven by a hydraulic motor; each of said hydraulic motors operate in a forward and a reverse mode in unison; said motors associated with said first pair of wheels being operably reversible when said first pair of wheels swings between configurations thereof such that all of said motors drive in the same direction whether said first pair of wheels are in the narrowed or widened configuration thereof.

11. The apparatus according to claim 1 wherein:
    a) said frame arms join with a remainder of said frame to form a U-shaped opening sized and shaped to receive a roll of sod such that the roll of sod is positioned between said frame arms and positioned front to back to be between said first pair of wheels and said third wheel; said apparatus being mobile to place the sod roll in said opening without lifting of the sod roll.

12. A sod lay apparatus comprising:
a) a structural frame having a pair of spaced apart frame arms; said frame arms being fixed in generally parallel relation with respect to each other;
b) a first pair of ground engaging wheels with each of said first pair of wheels mounted on a respective frame arm by respective wheel mounting structures; each of said first pair of wheels being rotatable relative to a respective frame arm so as to be selectively positionable on opposite sides of a respective frame arm such that said first pair of wheels has a widened configuration wherein each wheel is positioned on an outer side of a respective frame arm and a narrowed configuration wherein each wheel is positioned on an inner side of a respective frame arm such that the apparatus is configured to pass through comparatively narrow obstacles;
c) each of said wheel mounting structures includes a vertical pivot shaft sleeved in a mount attached to a respective frame arm;
d) each of said pivot shafts include a bore;
e) a pair of cylinders mounted at one end to a respective frame arm; each of said cylinders being joined to a pin having a first alignment wherein said pin is positioned in a respective bore for locking the wheel configuration and a second alignment wherein said pin is outside said bore allowing a respective one of said first pair of wheels to rotate on a respective shaft to modify the configuration thereof, and
f) a third ground engaging wheel supporting said frame opposite said arms.

13. A sod lay apparatus comprising:
a) a structural frame having a pair of spaced apart frame arms; said frame arms being fixed in generally parallel relation with respect to each other;
b) a first pair of ground engaging wheels with each of said first pair of wheels mounted on a respective frame arm; each of said first pair of wheels being rotatable relative to a respective frame arm so as to be selectively positionable on opposite sides of a respective frame arm such that said first pair of wheels has a widened configuration wherein each wheel is positioned on an outer side of a respective frame arm and a narrowed configuration wherein each wheel is positioned on an inner side of a respective frame arm such that the apparatus is configured to pass through comparatively narrow obstacles;
c) a third ground engaging wheel supporting said frame opposite said arms;
d) a fourth wheel; said first pair of wheels being on opposite sides of a front of said apparatus and said third and fourth wheels being on opposite sides of a rear of said apparatus;
e) said frame has front and rear section sides with said frame arms joined to said front section side;
and
f) said front and rear sections being pivotally joined by a front to rear extending axis, such that said frame articulates to allow each of said wheels to follow uneven terrain.

14. A sod lay apparatus comprising:
a) a structural frame having a pair of spaced apart frame arms; said frame arms being fixed in generally parallel relation with respect to each other;
b) a first pair of ground engaging wheels with each of said first pair of wheels mounted on a respective frame arm; each of said first pair of wheels being rotatable relative to a respective frame arm so as to be selectively positionable on opposite sides of a respective frame arm such that said first pair of wheels has a widened configuration wherein each wheel is positioned on an outer side of a respective frame arm and a narrowed configuration wherein each wheel is positioned on an inner side of a respective frame arm such that the apparatus is configured to pass through comparatively narrow obstacles;
c) a third ground engaging wheel supporting said frame opposite said arms; and
d) a forklift apparatus removably mounted on said frame opposite said frame arms.

* * * * *